United States Patent [19]

Tabbagh

[11] Patent Number: 4,972,150

[45] Date of Patent: Nov. 20, 1990

[54] PLURAL COIL INDUCTION DEVICE AND METHOD FOR DETERMINING IN A BOREHOLE THE AZIMUTH AND SLOPE OF A DISCONTINUITY LAYER IN A HOMOGENEOUS ENVIRONMENT

[75] Inventor: Alain Tabbagh, Colmery, France

[73] Assignee: Centre National de la Recherche Scientifique (CNRS), Paris, France

[21] Appl. No.: 377,530

[22] Filed: Jul. 10, 1989

[30] Foreign Application Priority Data

Jul. 11, 1988 [FR] France .................. 88 09391

[51] Int. Cl.$^5$ .................. G01V 3/28; G01V 3/38
[52] U.S. Cl. .................. 324/339; 324/343
[58] Field of Search .................. 324/339, 343, 346

[56] References Cited

U.S. PATENT DOCUMENTS

| | | | |
|---|---|---|---|
| 3,187,252 | 6/1965 | Hungerford | 324/343 |
| 3,259,837 | 7/1966 | Oshry | 324/339 |
| 3,609,521 | 9/1971 | Desbrandes | 324/343 |
| 3,808,520 | 4/1974 | Runge | 324/343 |
| 4,019,126 | 4/1977 | Meador | 324/333 |
| 4,360,777 | 11/1982 | Segesman | 324/343 X |

FOREIGN PATENT DOCUMENTS 2054159  2/1981  United Kingdom .

*Primary Examiner*—Gerard R. Strecker
*Attorney, Agent, or Firm*—Schweitzer, Cornman & Gross

[57] ABSTRACT

The invention relates to a device for the determination, in a borehole, of the slope and of the azimuth of a discontinuity layer in a homogeneous terrain. It includes three emitting induction coils (1a, 1b, 1c) and three receiving induction coils (2a, 2b, 2c), means for supplying each of the emitting coils with alternating electric current, means for measuring the responses of each of the receiving coils and for isolating in each of the three responses the part resulting from the excitation of each of the emitting coils, and means (7) for deducing from the parameters thus obtained the slope and the azimuth of a layer crossed by the device.

7 Claims, 3 Drawing Sheets

Fig:1

PLURAL COIL INDUCTION DEVICE AND METHOD FOR DETERMINING IN A BOREHOLE THE AZIMUTH AND SLOPE OF A DISCONTINUITY LAYER IN A HOMOGENEOUS ENVIRONMENT

The present invention concerns a device and a method for determining, in a borehole, the azimuth and slope of a discontinuity layer in a homogeneous environment.

The location of faults and fissured areas in a homogeneous terrain and, more generally, of any discontinuity layer, as well as the determination of their orientation, constitutes one of the data essential to the understanding and description of movements of water and heat in the crust of the earth. The electrical conductivity of such structures is one of the physical properties that offers the best contrast between these structures and their environment. In fact, it is very sensitive to variation in the porosity of a rock and constitutes a very good indicator.

Diagramming measured electrical conductivity can be performed by the electrical method in which a current is injected into the formation, or by inducing a current with a device having two or more coils parallel to the axis of the borehole. With such tools, a fault or a fissured area is manifested by a reduction of the apparent electrical resistivity, but the symmetry of revolution with respect to the axis of the bore which these measuring systems present does not make it possible to obtain indications of the azimuth or slope of a fault.

Several tools have recently been developed for the observation of small faults in the wall of a borehole. All of these devices give excellent results, particularly in water filled bores in crystalline or compact rocks, but they are applicable only to very small volumes and their range is limited to a few centimeters beyond the wall of the bore.

The present invention consequently aims to furnish a device and a method based on the induction phenomenon which will be sensitive to more voluminous structures, providing a range of several meters beyond the bore, and one which will be completely independent of the filling of this bore, the studied structures being then large faults, fissured areas, or, in the mining field. thin veins.

To this effect, the invention first of all has as its subject matter a device for determining, in a borehole, the slope and the azimuth of a discontinuity layer in a homogeneous terrain, characterized by the fact that it includes three emitting induction coils and three receiving induction coils, means for supplying alternating electric current to each of the emitting coils, means for measuring the responses of each of the receiving coils and for isolating, in each of the three responses, the part resulting from the excitation of each of the emitting coils, and means for deducing, from the parameters thus obtained, the slope and the azimuth of a layer traversed by the device.

The device according to the invention can also include means for measuring its orientation with respect to magnetic north, e.g., a gyroscope with a horizontal axis, a magnetometer, or a compass, so as to be able to determine how much it rotates on itself during its descent into the borehole The axes of the emitting coils and those of the receiving coils can form two orthogonal reference points, for example one deducted from the other by translation parallel to the vertical axis of the device.

It can be understood that it is relatively easy to distinguish, in each of the receiving coils, the responses due to each of the emitting coils, for it is necessary only that their frequency be different or that they be operated alternately.

The three frequencies are selected in the low-frequency range, e.g., between 1 kHz and 100 kHz, according to the average resistivity of the terrain.

Consequently there are nine responses referred to an orthogonal system, which can be represented in the form of a $3 \times 3$ matrix wherein each element corresponds to the action of an emitting coil on a receiving coil. Thus, $R_{yx}$ corresponds to the measurement in the receiving coil oriented on $O_x$ of the signal emitted by the coil oriented on $O_y$.

The orientation of a fault in space can then be plotted by computing the two angles determining the azimuth and the slope from the coefficients of the above-mentioned matrix.

The invention also has as its subject matter a method for determining in a bore the slope and the azimuth of a discontinuity layer in a homogeneous terrain, characterized by the fact that a device such as described above is introduced into the said borehole, the said parameters are obtained as the device descends therein, the crossing of the device through the median plane of a discontinuity layer is deduced from the development of at least one of the said parameters, and the slope and the azimuth of this layer are calculated for the values of the parameters found in the instant of the said crossing.

More particularly, the responses in phase are eliminated so as to retain only the responses in quadrature.

In the frequency range in question, the response in phase is proportional to the magnetic susceptibility of the earth, and the response in quadrature is proportional to the electrical conductivity, and only the latter is important for studying faults.

More particularly, the azimuth and the slope are calculated respectively by the following formulas:

$$tg\Phi = \frac{R_{xz}}{R_{yz}}.$$

$$tg\theta = \frac{R_{yz} \cos \Phi + R_{xz} \sin \Phi}{R_{yy} \cos^2 \Phi - R_{xy} \sin^2 \Phi}$$

wherein $R_{ij}$ is the response of the receiving coil j due to its excitation by the emitting coil i when the center of the device is in the median plane of the stratum.

An embodiment of the invention will now be described by way of non-limitative example, with reference to the annexed diagrammatic drawings, wherein.

Figure 1:
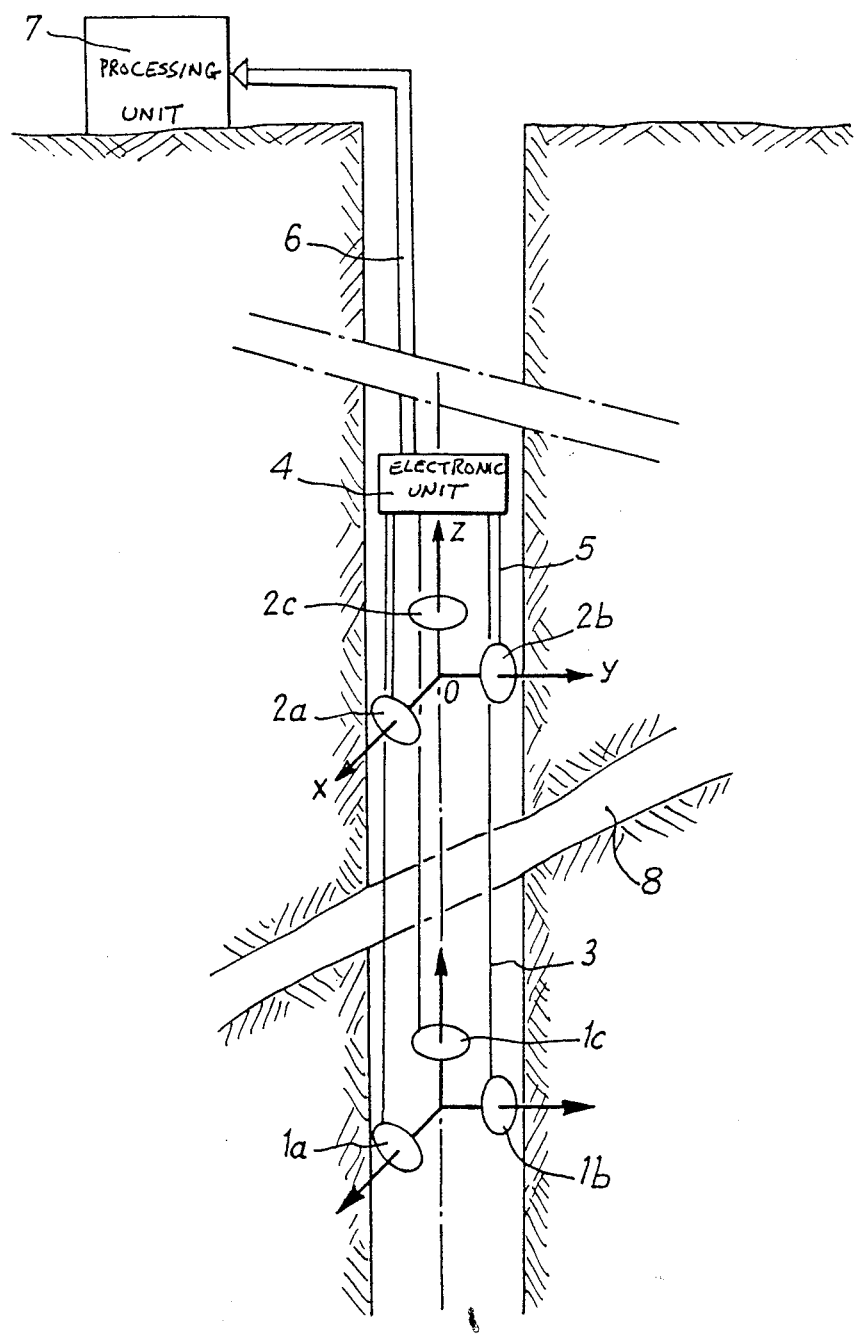
FIG. 1 shows a device according to the invention placed in a borehole.

The device of FIG. 1 includes three emitting coils 1a, 1b and 1c and three receiving coils 2a, 2b and 2c. The coils 1a, 1b, 2a and 2b have their axes horizontal when the device is in a vertical borehole, the axes of coils 1a and 2a being parallel to the axis Ox and the axes of coils 1b and 2b being parallel to the axis Oy of an orthonormal reference connected to the device.

The axes of coils 1c and 2c coincide with the axis of the borehole. Coils 1a, 1b and 1c are supplied with alternating electric current by means of conductors 3 from an electronic unit 4, and the current induced in the receiving coils 2a, 2b and 2c is transmitted to this unit 4 by means of conductors 5.

The unit 4 also includes means such as a magnetometer for detecting the orientation of the device with respect to magnetic north, e.g., the angle formed between the axis Ox and magnetic north.

A suspension cable 6 permits the various information to be transmitted from the electronic unit 4 to a processing unit 7. Means not shown make it possible to know the length of cable 6 that has been unreeled, and consequently the depth reached by the device in the borehole.

By way of example, the device according to the invention can be contained in a tube made of nonconductive and nonmagnetic material, with a diameter equal, for example, to 88 mm, which is the least of the range of ordinary petroleum tools. If the distance between the two units of emitting coils and receiving coils is, for example, equal to 120 cm (practically it can be selected in the range from 50 to 500 cm), then a 220 cm tube can be used so as to provide a protective space of about 50 cm at each end.

The coils can be at atmospheric pressure, the tube then withstanding the external pressure (which can amount to as much as 500 bar for a bore 5000 meters deep), or in an oil bath, the connections then being made through watertight lead-throughs.

In the embodiment in which the three coils 1a, 1b and 1c are to be supplied with power simultaneously, the frequencies of 12 kHz, 16.97 kHz and 24 kHz can be selected. Consequently, in the response of each of the receiving coils 2a, 2b and 2c. these three frequencies will be found, and they are separated by means of appropriate filters in the electronic unit 4 so as to obtain the nine responses $R_{ij}$. Lastly, unit 4 includes circuits which can separate the responses in phase and the responses in quadrature so as to retain only the latter, the only ones of interest to the operation of the invention.

Coils 1a and 1b on the one hand, and 2a and 2b on the other hand can be elongated rectangular coils vertically intersecting at the axis Oz of the borehole, and coils 1c and 2c can be of the solenoid type, wound if desired around the vertical coils.

Figure 2:
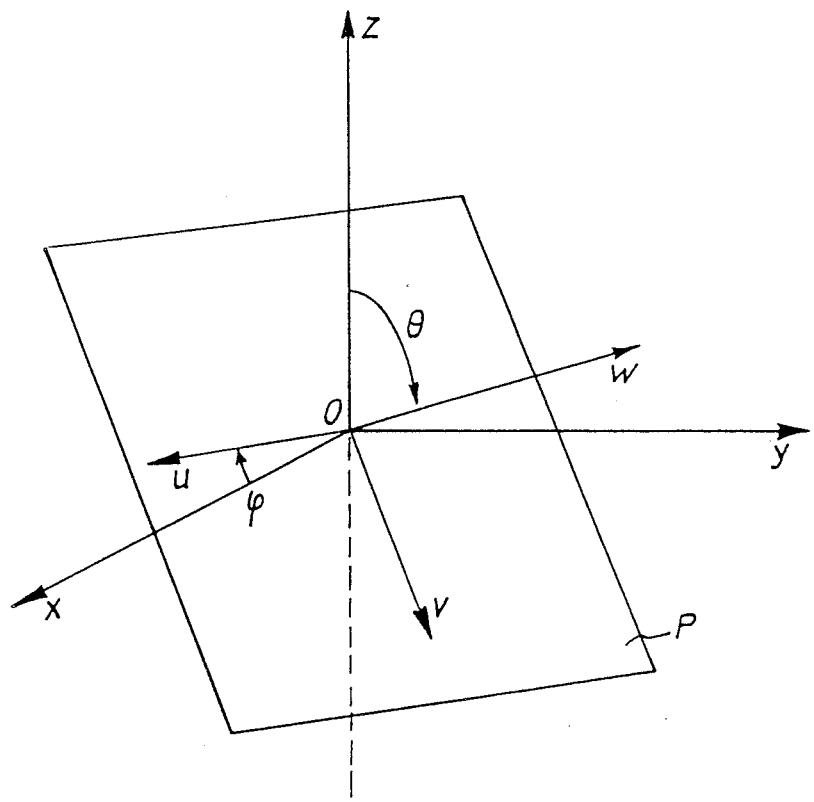
FIG. 2 shows the geometric relationships of a vertically descending inventive device through the borehole as it intersects with a fault traversing said borehole.

FIG. 1 represents the device of the invention when it is crossed at its center by a fault 8. The location of the fault in space is determined on the one hand by the depth of the device at the instant in which it intersects this fault, and on the other hand by the angles $\Phi$ and $\theta$ of FIG. 2 which define the change of references necessary to change from point of reference Oxyz connected to the device to the point of reference Ouvw connected to the fault. More particularly the axis Ou is the horizontal axis contained in the median plane P of the fault, axis Ov is the axis perpendicular to Ou also contained in plane P, and the axis Ow is the axis perpendicular to this plane.

Knowledge of the angle $\Phi$ consequently furnishes the azimuth of the plane P, because the orientation of the device with respect to magnetic north is known, and the angle $\theta$ directly gives the slope of this plane.

It can be shown that the angles $\Phi$ and $\theta$ are determined by the following formulas:

$$tg\Phi = \frac{R_{xz}}{R_{yz}}.$$

$$tg\theta = \frac{R_{yz} \cos \Phi + R_{xz} \sin \Phi}{R_{yy} \cos^2 \Phi - R_{xy} \sin^2 \Phi}$$

wherein $R_{ij}$ is the response of the receiving coil j due to its excitation by the emitting coil i when the median plane P of the fault intersects the center of the device according to the invention.

Figures 3A, 3B:
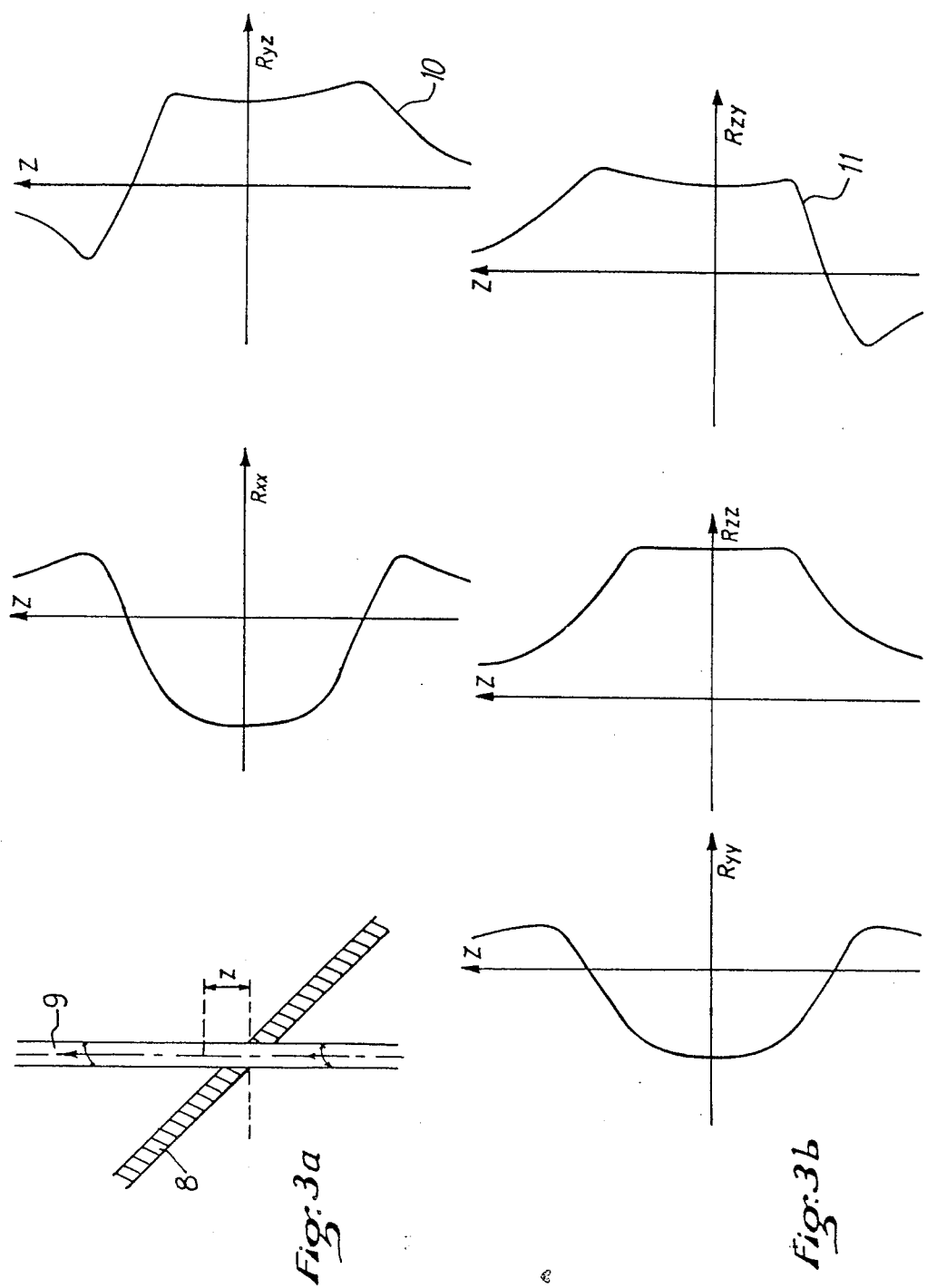
FIG. 3a shows this bore cutting through such a fault.
FIG. 3b represents different responses obtained with the device while passing through a fault.

FIG. 3b represents the different responses obtained as the device descends into a borehole 9 in the vicinity of the fault 8. according to the distance z between the center of the device and the point of intersection of the axis of the borehole with the median plane P of the fault 8.

It is found that the nondiagonal terms of the matrix $R_{ij}$ are symmetrical with respect to the plane Z—0 (curve 10 representing the variations of $R_{yz}$ and curve 11 representing the variations of $R_{zy}$).

The approach of a fault can easily be detected by means of these diagonal terms which then abruptly assume a value other than zero. The vertical position of the median plane can be determined by the maximum of $R_{xx}$ or of $R_{yy}$ or else by the average of the maximum spread of $R_{zz}$.

Practically, all these parameters are detected and stored as the descent of the device in the borehole 9 proceeds, the processing unit 7 determining the vertical position of the median plane and computing the angles $\Phi$ and $\theta$ for the values of the parameters corresponding to this plane.

It has been found that the diagonal terms of the matrix of responses are not very sensitive to the orientation of a fault or of a conductive fissured area, but on the other hand they clearly indicate the point where the center of the device passes through the median plane of the fault. The nondiagonal terms of this matrix are entirely dependent on the slope and azimuth angles, and on a value which is entirely meaningful and measurable in relation to the diagonal terms, so that they make it possible to obtain the two angles $\Phi$ and $\theta$ above mentioned.

A number of variants and modifications can, of course, be made in the above description without departing either from the scope or from the spirit of the invention.

I claim:

1. Apparatus for determination of the slope and the azimuth of a discontinuity layer traversing a borehole in a homogeneous terrain, comprising:
   (a) three emitting induction coils;
   (b) means for supplying an alternating electric current connected to said three emitting induction coils;
   (c) three receiving induction coils spaced from said emitting inductive coils, each for receiving signals emitted by each of said three emitting induction coils;
   (d) means for measuring the electrical response of each of the receiving induction coils to the received signals and for isolating in each of the responses the parts resulting from the excitation of each of said emitting coils in the signal received by each of said three receiving coils;

(e) processing means for deducing from the measured electrical responses the slope and azimuth of said layer, and (f) means outputting electrical signals representative of said slope and azimuth of said discontinuity layer.

2. Apparatus according to claim 1, characterized by the fact that it includes means for measuring its orientation with respect to magnetic north.

3. Apparatus according to claim 1, characterized by the fact that the axes of the emitting coils and those of the receiving coils form orthogonal reference points.

4. Apparatus according to claim 3, characterized by the fact that one of the reference points is deduced from the other by translation parallel to the axis of the apparatus.

5. Method for determining the slope and the azimuth of a discontinuity layer in a borehole in a homogeneous terrain, comprising:

(a) generating emitted signals from three gradually descending orthogonally related induction coil sources within said borehole;

(b) receiving in each of three induction receiving coils spaced from the three induction coil sources said emitted signals;

(c) measuring the electrical response of each of the three induction receiving coils to the received signals while isolating in each of the responses the parts resulting from the respective excitation at each of the emitting coils in the signal received by each of the receiving coils;

(d) processing the measured electrical responses from said receiver coils to determine the slope and azimuth of said discontinuity layer, and (e) generating and outputting electrical signals representative of the determined values of slope and azimuth.

6. Method according to claim 5, characterized in that (a) any of said response which are in phase are eliminated, and (b) all of said responses which are in quadrature are retained.

7. Method according to claim 5, characterized in that the azimuth and the slope are respectively calculated by the following formulas:

$$tg\Phi = \frac{R_{xz}}{R_{yz}}$$

$$tg\theta = \frac{R_{yz} \cos \Phi + R_{xz} \sin \Phi}{R_{yy} \cos^2 \Phi - R_{xy} \sin^2 \Phi}$$

wherein $R_{ij}$ is the response of the receiving coil j due to its excitation by the emitting coil i when the center of the device is in the median plane of the layer.

* * * * *